United States Patent
Harder et al.

(10) Patent No.: US 10,473,034 B2
(45) Date of Patent: Nov. 12, 2019

(54) GAS TURBINE ENGINE STARTER REDUCTION GEAR TRAIN WITH GEARED ROTARY ACTUATOR

(71) Applicant: Hamilton Sundstrand Corporation, Charlotte, NC (US)

(72) Inventors: Benjamin T. Harder, DeKalb, IL (US); Brian McMasters, Caledonia, IL (US); James Vandung Nguyen, Rockford, IL (US); Dwayne Leon Wilson, Rockford, IL (US); Paul F. Fox, Loves Park, IL (US); Richard Alan Davis, Stillman Valley, IL (US); Richard R. Hergert, Rockton, IL (US); Jeffrey Todd Roberts, Winnebago, IL (US); Jeff A. Brown, Cherry Valley, IL (US); Daniel Richard Walker, Rockford, IL (US); Matthew Allen Slayter, Rockford, IL (US); William G. Sheridan, Southington, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 799 days.

(21) Appl. No.: 15/201,841

(22) Filed: Jul. 5, 2016

(65) Prior Publication Data
US 2018/0010523 A1 Jan. 11, 2018

(51) Int. Cl.
*F02C 7/275* (2006.01)
*F02C 7/36* (2006.01)
(Continued)

(52) U.S. Cl.
CPC .............. *F02C 7/275* (2013.01); *F01D 21/12* (2013.01); *F01D 25/34* (2013.01); *F02C 7/277* (2013.01);
(Continued)

(58) Field of Classification Search
CPC .. F02C 7/275; F02C 7/32; F02C 7/277; F02C 7/36; F01D 25/34; F01D 25/36;
(Continued)

(56) References Cited

U.S. PATENT DOCUMENTS

| 3,793,905 A | 2/1974 | Black et al. |
| 3,951,008 A | 4/1976 | Schneider et al. |

(Continued)

FOREIGN PATENT DOCUMENTS

| EP | 2320067 A2 | 5/2011 |
| WO | 2016069303 A1 | 5/2016 |

OTHER PUBLICATIONS

Extended European Search Report for Application No. 17179515.6-1607 dated Nov. 20, 2017 (8 pp.).
(Continued)

*Primary Examiner* — Jason D Shanske
*Assistant Examiner* — Danielle M. Christensen
(74) *Attorney, Agent, or Firm* — Cantor Colburn LLP

(57) ABSTRACT

According to an aspect, a system for a gas turbine engine includes a reduction gear train operable to drive rotation of a starter gear train that interfaces to an accessory gearbox of the gas turbine engine. The reduction gear train includes a starter interface gear that engages the starter gear train and a core-turning clutch operably connected to the starter interface gear. The reduction gear train also includes a geared rotary actuator including a primary planetary gear system, where the geared rotary actuator is operably connected to the core-turning clutch. The reduction gear train further includes a secondary planetary gear system operably connected to the primary planetary gear system and a core-turning input. The system also includes a mounting pad with an interface to couple a core-turning motor to the core-turning input of the reduction gear train.

20 Claims, 3 Drawing Sheets

(51) Int. Cl.
*F16H 1/46* (2006.01)
*F01D 21/12* (2006.01)
*F01D 25/34* (2006.01)
*F02C 7/277* (2006.01)
*F02C 7/32* (2006.01)

(52) U.S. Cl.
CPC ............... *F02C 7/32* (2013.01); *F02C 7/36* (2013.01); *F16H 1/46* (2013.01); *F05D 2220/32* (2013.01); *F05D 2220/323* (2013.01); *F05D 2260/40311* (2013.01); *F05D 2260/85* (2013.01)

(58) Field of Classification Search
CPC .......... F01D 21/12; F01D 21/04; F01D 21/08; F01D 19/00; F01D 19/02; F16H 1/46; F05D 2260/40311; F05D 2260/85
See application file for complete search history.

(56) References Cited

U.S. PATENT DOCUMENTS

| | | | |
|---|---|---|---|
| 7,481,062 | B2 | 1/2009 | Gaines et al. |
| 7,882,691 | B2 | 2/2011 | Lemmers, Jr. et al. |
| 9,664,070 | B1 * | 5/2017 | Clauson ............ F01D 25/36 |
| 2006/0188372 | A1 | 8/2006 | Hansen |
| 2007/0151258 | A1 | 7/2007 | Gaines et al. |
| 2009/0007569 | A1 | 1/2009 | Lemmers, Jr. et al. |
| 2014/0026689 | A1 | 1/2014 | Nakamura et al. |
| 2014/0318144 | A1 | 10/2014 | Lazzeri et al. |
| 2017/0234234 | A1 | 8/2017 | Pech et al. |
| 2018/0010522 | A1 | 1/2018 | Harder et al. |

OTHER PUBLICATIONS

Extended European Search Report for Application No. 17179519.8-1607 dated Nov. 16, 2017 (9 pp.).
Extended European Search Report for Application No. 17179784.6-1607 dated Nov. 23, 2017 (10 pp.).

* cited by examiner

GAS TURBINE ENGINE STARTER REDUCTION GEAR TRAIN WITH GEARED ROTARY ACTUATOR

BACKGROUND

The subject matter disclosed herein generally relates to engine starter systems, and more specifically to interfacing a reduction gear train for a core-turning motor with a starter of a gas turbine engine.

Modern aircraft gas turbine engines operate with relatively small radial clearances in order to optimize the efficiency of the engine. When such an engine is shut down, heat from the engine core rises to the top of the engine case, and this uneven distribution of heat can result in the engine rotor axis bending or "bowing". If an engine is re-started in this condition, it can result in potential damage or reduced performance. One potential solution to this is to rotate the engine at very low speed after it is turned off. By allowing the rotor to rotate slowly, heat is dissipated evenly and rotor bow can be minimized. A pneumatic turbine starter can be used to both start and motor (i.e., turn at a speed less than the starting speed) the engine using available compressed air from a variety of sources. However, both an air valve used to regulate the compressed air supplied to the starter and the starter itself are typically designed primarily for short duration transient operations, not continuous motoring at low speeds. Regulating the air supply and operating at moderate torque and speeds of normal engine motoring can be detrimental to the life of the air valve and starter.

SUMMARY

According to one embodiment, a system for a gas turbine engine includes a reduction gear train operable to drive rotation of a starter gear train that interfaces to an accessory gearbox of the gas turbine engine. The reduction gear train includes a starter interface gear that engages the starter gear train and a core-turning clutch operably connected to the starter interface gear. The reduction gear train also includes a geared rotary actuator including a primary planetary gear system, where the geared rotary actuator is operably connected to the core-turning clutch. The reduction gear train further includes a secondary planetary gear system operably connected to the primary planetary gear system and a core-turning input. The system also includes a mounting pad with an interface to couple a core-turning motor to the core-turning input of the reduction gear train.

In addition to one or more of the features described above, or as an alternative, further embodiments may include where the starter interface gear engages a planet gear of the starter gear train, and the starter gear train is operably connected to the accessory gearbox through a starter clutch.

In addition to one or more of the features described above, or as an alternative, further embodiments may include where the core-turning clutch is an overrunning clutch.

In addition to one or more of the features described above, or as an alternative, further embodiments may include where the geared rotary actuator further includes a ring gear driven by a carrier system.

In addition to one or more of the features described above, or as an alternative, further embodiments may include where the ring gear is operably connected to a splined shaft that interfaces with the core-turning clutch.

In addition to one or more of the features described above, or as an alternative, further embodiments may include where the primary planetary system includes a sun gear operably connected to at least one planet gear that is operably connected to the carrier system.

In addition to one or more of the features described above, or as an alternative, further embodiments may include where each of the at least one planet gear is operably connected to an intermediate gear on a respective intermediate shaft, and the intermediate gear is operably connected to the ring gear.

According to another embodiment, an integrated starter and core-turning system for a gas turbine engine is provided. The integrated starter and core-turning system includes a starter and a reduction gearbox. The starter includes a starter gear train that interfaces to an accessory gearbox of the gas turbine engine. The reduction gearbox includes reduction gear train operable to drive rotation of the starter gear train. The reduction gear train includes starter interface gear operably connected to the starter gear train and a core-turning clutch operably connected to the starter interface gear. The reduction gear train further includes a geared rotary actuator including a primary planetary gear system, where the geared rotary actuator is operably connected to the core-turning clutch. The reduction gear train also includes a secondary planetary gear system operably connected to the primary planetary gear system and a core-turning input. The reduction gearbox also includes a mounting pad with an interface to couple a core-turning motor to the core-turning input of the reduction gear train.

In addition to one or more of the features described above, or as an alternative, further embodiments may include where the core-turning motor is an electric motor.

In addition to one or more of the features described above, or as an alternative, further embodiments may include where the starter and the reduction gearbox are integrally formed within an outer housing.

A further embodiment includes a method of transmitting torque in a system for a gas turbine engine. The method includes transmitting torque output of a core-turning motor through a core-turning input of a reduction gear train of the system. The method also includes transmitting torque at the core-turning input through a secondary planetary gear system and a primary planetary gear system of the reduction gear train, where the primary planetary gear system includes a portion of a geared rotary actuator. Torque is transmitted from the geared rotary actuator through a starter interface gear operably connected to a core-turning clutch. Torque is also transmitted from the starter interface gear to drive rotation of a starter gear train that interfaces to an accessory gearbox of the gas turbine engine.

In addition to one or more of the features described above, or as an alternative, further embodiments may include transmitting torque from a starter turbine through the starter gear train to the accessory gearbox.

In addition to one or more of the features described above, or as an alternative, further embodiments may include decoupling, by the core-turning clutch, engagement of the reduction gear train with the starter gear train in response to the torque from the starter turbine.

Technical effects of embodiments of the present disclosure include transmitting torque in a starter and core-turning system for a gas turbine engine using a reduction gear set and a core-turning motor operable to rotate an engine core for bowed rotor prevention/mitigation and also allow pneumatic starting of the engine at higher speeds of rotation.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

The detailed description explains embodiments of the present disclosure, together with advantages and features, by way of example with reference to the drawings.

DETAILED DESCRIPTION

Figure 1:
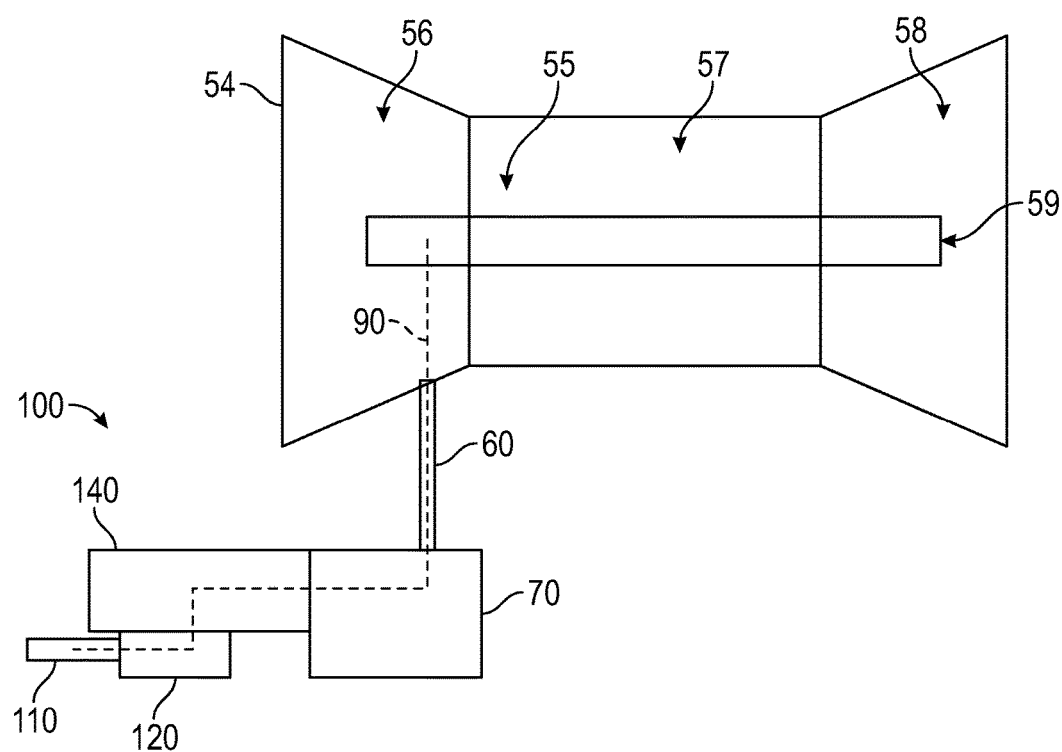
FIG. 1 is a block diagram of an engine and associated system, according to an embodiment of the present disclosure.
Figure 2:
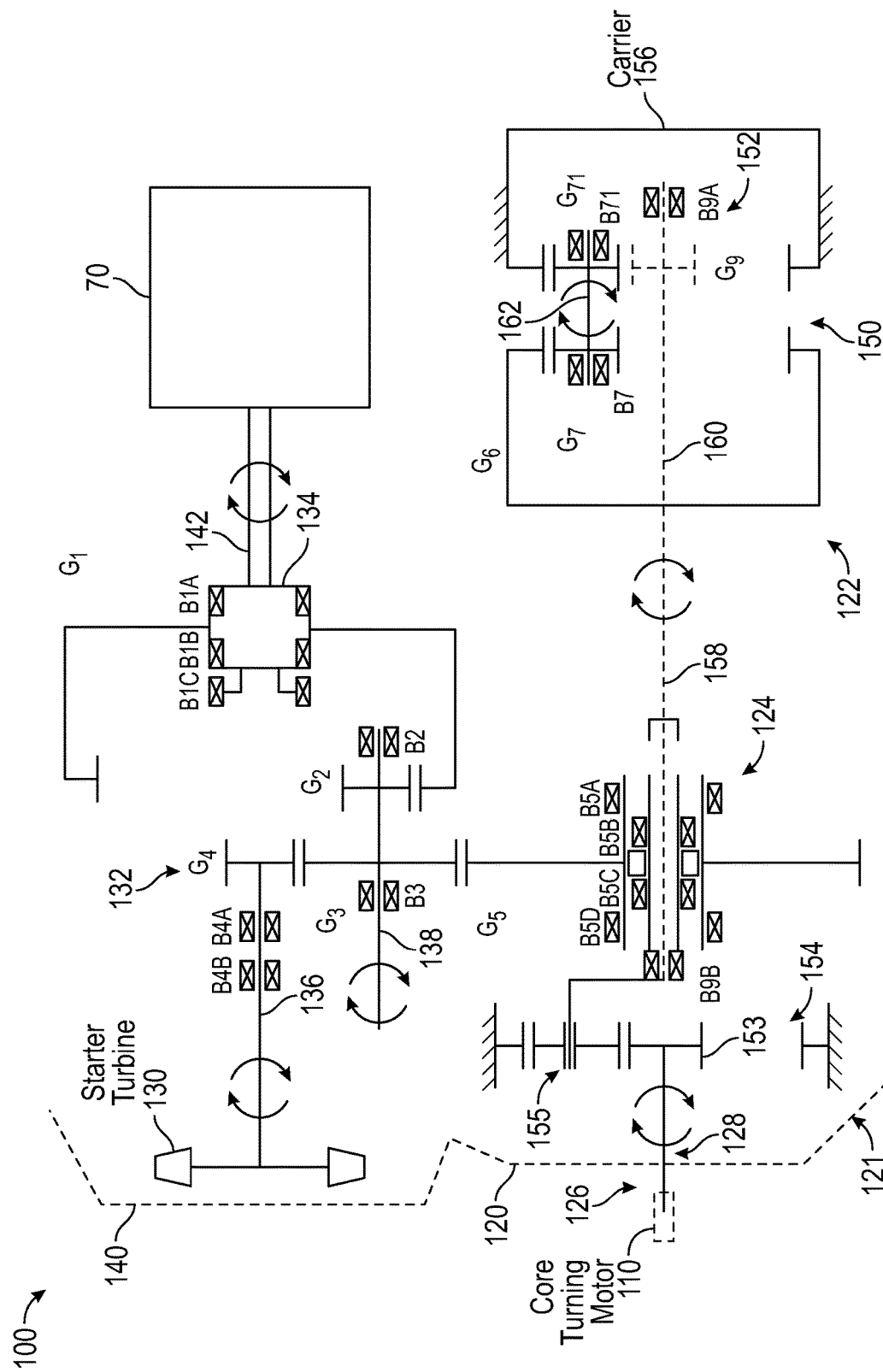
FIG. 2 is a schematic view of a starter and core-turning system, according to an embodiment of the present disclosure.

Referring now to FIGS. 1 and 2, various embodiments of the present disclosure are illustrated. FIG. 1 shows a block diagram of an engine 54, such as a gas turbine engine, and an associated system 100, according to an embodiment of the present disclosure. FIG. 2 shows a schematic view of the system 100 of FIG. 1, according to an embodiment of the present disclosure.

The system 100 includes a reduction gearbox 120 and a starter 140 that may be integrally formed within an outer housing 121. The system 100 is operably connected to the engine 54 through an accessory gear box 70 and drive shaft 60 (e.g., a tower shaft), as shown in FIG. 1. Operable connections can include gear mesh connections that in some instances can be selectively engaged or disengaged, for instance, through one or more clutches. The reduction gearbox 120 includes a reduction gear train 122 within the outer housing 121. A core-turning motor 110 is operably connected to the reduction gear train 122 at a mounting pad 126 that interfaces to a core-turning input 128 of the reduction gear train 122. In an embodiment, the core-turning motor 110 may be an electric motor. A core-turning clutch 124 interfaces the reduction gear train 122 to a starter gear train 132 of a starter 140. The core-turning clutch 124 may be operably connected to accessory gearbox 70 through the starter 140 and a starter output shaft 142. In operation, the core-turning clutch 124 may engage and disengage the reduction gear train 122 with the starter gear train 132. The starter 140 can also include a starter clutch 134 that operably connects the accessory gearbox 70 to the starter gear train 132.

A starter turbine 136 of the starter 140 is configured to initiate a startup process of the engine 54 by getting a rotor shaft 59 of engine core 55 (e.g., a starting spool) of the engine 54 rotating. The rotor shaft 59 operably connects an engine compressor 56 to an engine turbine 58. Thus, once the engine compressor 56 starts spinning, air is pulled into combustion chamber 57 and mixes with fuel for combustion. Once the air and fuel mixture combusts in the combustion chamber 57, a resulting compressed gas flow drives rotation of the engine turbine 58, which rotates the engine turbine 58 and subsequently the engine compressor 56. Although only a single instance of an engine compressor-turbine pair is depicted in the example of FIG. 1, it will be understood that embodiments can include any number of spools, such as high/mid/low pressure engine compressor-turbine pairs within engine 54.

The starter 140 is further operable to drive rotation of the rotor shaft 59 at a lower speed for a longer duration than typically used for engine starting in a motoring mode of operation (also referred to as dry motoring) to prevent/reduce a bowed rotor condition. The core-turning motor 110 is operable to slowly rotate the rotor shaft 59 at a much slower speed than is typically used for motoring or engine starting, for instance, less than 10 revolutions per minute as compared to greater than 1000 revolutions per minute. The core-turning motor 110 can be used to prevent or slowly reduce a bowed rotor condition. If a bowed rotor condition has developed, for instance, due to a hot engine shutdown and without taking further immediate action, motoring may be performed by the starter 140 to more rapidly reduce a bowed rotor condition but may reduce service life of some starter system components. If a bowed rotor condition has not yet developed, the rotor shaft 59 can be slowly rotated by the core-turning motor 110 while allowing time for substantially even cooling within the engine 54.

As depicted in the example of FIGS. 1 and 2, the core-turning motor 110 is connected to the engine 54 by a drive line 90, which runs from the core-turning motor 110, to the reduction gear train 122 through the core-turning clutch 124, to the starter 140, to the starter output shaft 142, to the accessory gearbox 70, to the drive shaft 60, and finally to the rotor shaft 59 of the engine 54. The core-turning motor 110 operates at a high angular velocity to get the rotor shaft 59 of the engine 54 turning at a low angular velocity through the reduction ratio established by the reduction gear train 122. When engine core-turning is active to prevent a bowed rotor condition, both the starter clutch 134 and the core-turning clutch 124 are engaged to enable the core-turning motor 110 to drive rotation of the rotor shaft 59. During the startup process, the starter clutch 134 is engaged so that rotational toque is transferred from the starter gear train 132 to the rotor shaft 59 through the drive line 90; however, the core-turning clutch 124 is disengaged to prevent the starter 140 from back driving the core-turning motor 110. Once the startup process has been completed, the starter 140 is disengaged from the engine 54 to prevent over-speed conditions when the engine 54 operates at its normal higher speeds. Thus, the starter clutch 134 disengages the starter gear train 132 once the startup process has been completed.

Figure 3:
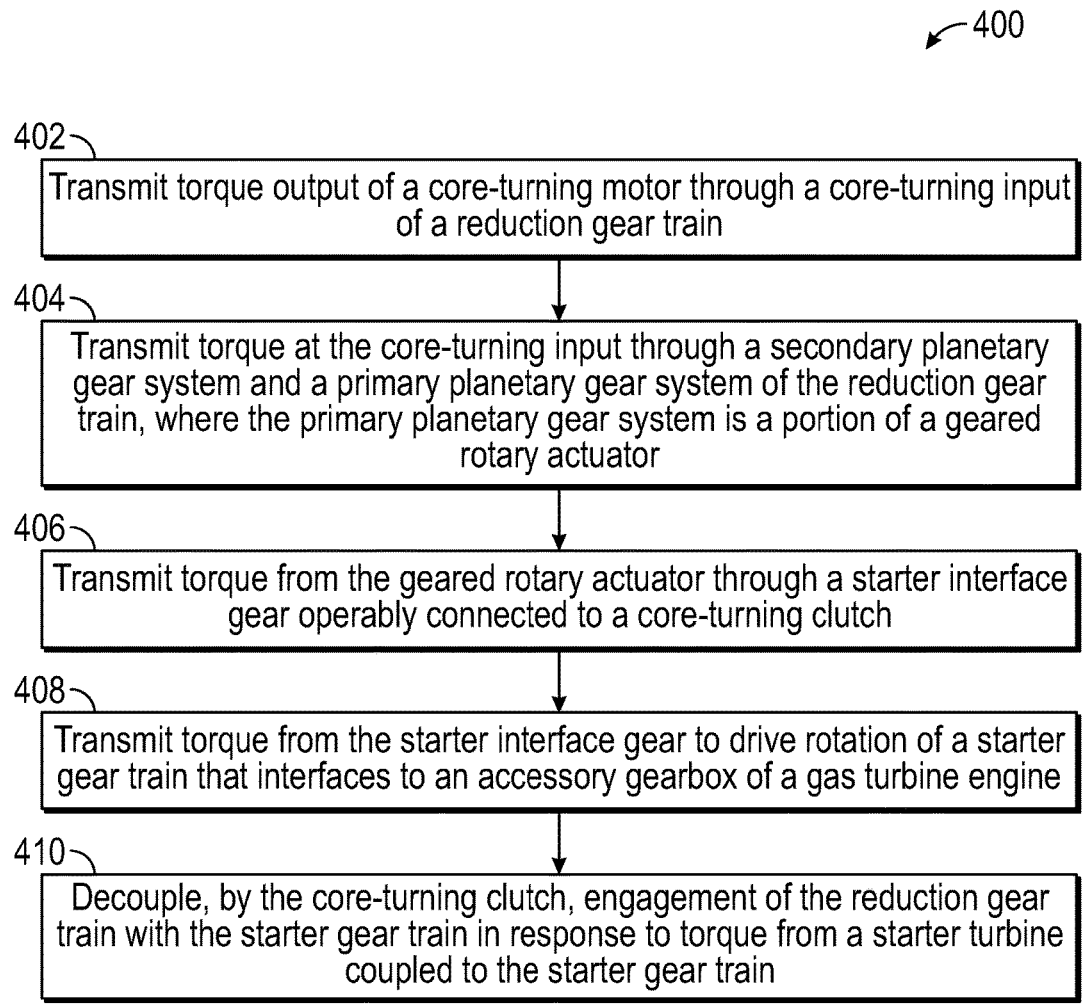
FIG. 3 is a flow process illustrating a method of transmitting torque in a system for a gas turbine engine according to an embodiment of the present disclosure.

The starter 140 can be implemented as a pneumatic starter that receives compressed air at starter turbine 130, which is attached to a gear G4 through starter input shaft 136 supported by bearings B4A and B4B. The starter turbine 130 reaction transmits torque through the gear G4 to one or more planet gears G3. In FIG. 3, the system 100 is depicted as a two-stage reduction gear system with torque transmitted through planet gear G3 to gear G2 by intermediate shaft 138 supported by bearings B2 and B3. Torque is then transmitted from gear G2 to ring gear G1. The ring gear G1 transmits torque through the starter clutch 134 supported by bearings B1A, B1B, and B1C to the starter output shaft 142, which is coupled to the accessory gearbox 70 and subsequently to the engine rotor shaft 59. Once either an engine motoring event is complete or the engine 54 has successfully starter, a compressed air supply can be turned off by an upstream air valve, and the starter clutch 134 allows the internal components of the starter 140 to cease operation as the engine 54 continues to operate. During this operating mode (e.g., engine ignition achieved), the reduction gearbox 120 and core-turning motor 110 are not required to operate. Embodiments ensure the reduction gearbox 120 and the core-turning motor 110 are decoupled from the starter gear train 132 through the core-turning clutch 124 which allows gear G5 to rotate independent of the reduction gearbox 120 and the core-turning motor 110. In this way embodiments do not adversely affect engine start and motoring operation of the starter 140.

To turn the engine core 55 in a bowed rotor prevention mode after engine shutdown, core-turning motor 110 is turned on, which drives one or more planetary gear systems and a series of gears and carriers to reduce rotational speed and multiply the torque output of the core-turning motor 110. Torque can be transmitted through the core-turning clutch 124 and starter interface gear G5 to planet gear G3 of the starter gear train 132 (i.e., G5/G3 gear mesh), and the starter gear train 132 can be used to deliver torque to turn the engine core 55 at a targeted speed.

As depicted in the example of FIG. 2, the core-turning clutch 124 is operably connected to the starter interface gear G5. The core-turning clutch 124 is supported by bearings BSA, BSB, BSC, and BSD. A geared rotary actuator 150 includes a primary planetary gear system 152, where the geared rotary actuator 150 is operably connected to the core-turning clutch 124. A secondary planetary gear system 154 is operably connected to the primary planetary gear system 152 and core-turning input 128. The secondary planetary gear system 154 can include a sun gear 153 coupled to the core-turning input 128 and one or more planet gears 155 operably coupled to a shaft 160. In an embodiment, the mounting pad 126 can include an interface to couple the core-turning motor 110 to the core-turning input 128 of the reduction gear train 122. The starter gear train 132 can be operably connected to the accessory gearbox 70 through a starter clutch 134. The geared rotary actuator 150 can also include a ring gear G6 driven by a carrier system 156. The ring gear G6 can be operably connected to a splined shaft 158 that interfaces with the core-turning clutch 124. The primary planetary system 152 can include a sun gear G9 operably driven by shaft 160 supported by bearings B9A and B9B. The sun gear G9 is operably connected to at least one planet gear G71 that is operably connected to the carrier system 156. Each of the at least one planet gear G71 is operably connected to an intermediate gear G7 on a respective intermediate shaft 162 supported by bearings B7 and B71, and the intermediate gear G7 is operably connected to the ring gear G6.

Referring now to FIG. 3 while referencing components of the system 100 of FIGS. 1 and 2, a flow process illustrating a method 400 of transmitting torque in the system 100 of FIG. 2 is depicted, according to an embodiment of the present disclosure. At block 402, torque output of core-turning motor 110 is transmitted through core-turning input 128 of reduction gear train 122 of the system 100. At block 404, torque is transmitted at the core-turning input 128 through secondary planetary gear system 154 and primary planetary gear system 152 of the reduction gear train 122, where the primary planetary gear system 152 is a portion of geared rotary actuator 150. At block 406, torque is transmitted from the geared rotary actuator 150 through starter interface gear G5 operably connected to core-turning clutch 124. At block 408, torque is transmitted from the starter interface gear G5 to drive rotation of starter gear train 132 that interfaces to accessory gearbox 70 of the gas turbine engine 54. Torque from starter turbine 130 can be transmitted through the starter gear train 132 to the accessory gearbox 70 when higher speed rotation of the engine core 55 is needed, for instance, at engine start or during dry motoring. At block 410, the core-turning clutch 124 can decouple engagement of the reduction gear train 122 with the starter gear train 132 in response to the torque from the starter turbine 130, for instance, where the core-turning clutch 124 is an overrunning clutch. Similarly, the starter clutch 134 can decouple engagement between the starter 140 and the accessory gearbox 70 to prevent the gas turbine engine 54 from back-driving the starter 140 and the core-turning motor 110 at higher operating speeds, for instance, after the gas turbine engine 54 has been started.

While the above description has described the flow process of FIG. 3 in a particular order, it should be appreciated that unless otherwise specifically required in the attached claims that the ordering of the steps may be varied.

Embodiments can be integrated with an existing pneumatic starter, providing dual function for a single gearbox-mounted component. The core-turning clutch and the starter clutch allow normal engine starting and motoring operation and prevent rotation when not required. The various gear trains provide a compact design to allow for optimization of the physical system envelope. The possible gear ratios obtained in embodiments allow a compact motor to be used at typical motor operating speeds, while still meeting the starter output torque requirements for turning an engine core. The number of gear elements and sizing can be adjusted to optimize speed and output torque for a specific engine application. Enabling a motor-driven operating mode allows finer control of the engine rotor speed, and reduces both the speed and loading of the starter gear train, which reduces the operating mode impact on product life.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A system for a gas turbine engine comprising:
  a reduction gear train operable to drive rotation of a starter gear train that interfaces to an accessory gearbox of the gas turbine engine, the reduction gear train comprising:
    a starter interface gear that engages the starter gear train;
    a core-turning clutch operably connected to the starter interface gear;
    a geared rotary actuator comprising a primary planetary gear system, the geared rotary actuator operably connected to the core-turning clutch; and
    a secondary planetary gear system operably connected to the primary planetary gear system and a core-turning input; and
  a mounting pad comprising an interface to couple a core-turning motor to the core-turning input of the reduction gear train.

2. The system of claim 1, wherein the starter interface gear engages a planet gear of the starter gear train, and the starter gear train is operably connected to the accessory gearbox through a starter clutch.

3. The system of claim 1, wherein the core-turning clutch is an overrunning clutch.

4. The system of claim 1, wherein the geared rotary actuator further comprises a ring gear driven by a carrier system.

5. The system of claim 4, wherein the ring gear is operably connected to a splined shaft that interfaces with the core-turning clutch.

6. The system of claim 4, wherein the primary planetary system comprises a sun gear operably connected to at least one planet gear that is operably connected to the carrier system.

7. The system of claim 6, wherein each of the at least one planet gear is operably connected to an intermediate gear on a respective intermediate shaft, and the intermediate gear is operably connected to the ring gear.

8. An integrated starter and core-turning system for a gas turbine engine, the integrated starter and core-turning system comprising:
a starter comprising a starter gear train that interfaces to an accessory gearbox of the gas turbine engine; and
a reduction gearbox comprising:
a reduction gear train operable to drive rotation of the starter gear train, the reduction gear train comprising:
a starter interface gear operably connected to the starter gear train;
a core-turning clutch operably connected to the starter interface gear;
a geared rotary actuator comprising a primary planetary gear system, where the geared rotary actuator operably connected to the core-turning clutch; and
a secondary planetary gear system operably connected to the primary planetary gear system and a core-turning input; and
a mounting pad comprising an interface to couple a core-turning motor to the core-turning input of the reduction gear train.

9. The integrated starter and core-turning system of claim 8, wherein the starter interface gear engages a planet gear of the starter gear train, and the starter gear train is operably connected to the accessory gearbox through a starter clutch.

10. The integrated starter and core-turning system of claim 8, wherein the core-turning clutch is an overrunning clutch, the starter comprises a turbine that drives the starter gear train, and the core-turning motor is an electric motor.

11. The integrated starter and core-turning system of claim 8, wherein the geared rotary actuator further comprises a ring gear driven by a carrier system.

12. The integrated starter and core-turning system of claim 11, wherein the ring gear is operably connected to a splined shaft that interfaces with the core-turning clutch.

13. The integrated starter and core-turning system of claim 11, wherein the primary planetary system comprises a sun gear operably connected to at least one planet gear that is operably connected to the carrier system.

14. The integrated starter and core-turning system of claim 13, wherein each of the at least one planet gear is operably connected to an intermediate gear on a respective intermediate shaft, and the intermediate gear is operably connected to the ring gear.

15. The integrated starter and core-turning system of claim 8, wherein the starter and the reduction gearbox are integrally formed within an outer housing.

16. A method of transmitting torque in a system for a gas turbine engine, the method comprising:
transmitting torque output of a core-turning motor through a core-turning input of a reduction gear train of the system;
transmitting torque at the core-turning input through a secondary planetary gear system and a primary planetary gear system of the reduction gear train, wherein the primary planetary gear system comprises a portion of a geared rotary actuator;
transmitting torque from the geared rotary actuator through a starter interface gear operably connected to a core-turning clutch; and
transmitting torque from the starter interface gear to drive rotation of a starter gear train that interfaces to an accessory gearbox of the gas turbine engine.

17. The method of claim 16, further comprising:
transmitting torque from a starter turbine through the starter gear train to the accessory gearbox.

18. The method of claim 17, further comprising:
decoupling, by the core-turning clutch, engagement of the reduction gear train with the starter gear train in response to the torque from the starter turbine.

19. The method of claim 18, wherein the starter interface gear engages a planet gear of the starter gear train, and the starter gear train is operably connected to the accessory gearbox through a starter clutch.

20. The method of claim 16, wherein the geared rotary actuator further comprises a ring gear driven by a carrier system, the ring gear is operably connected to a splined shaft that interfaces with the core-turning clutch, the primary planetary system comprises a sun gear operably connected to at least one planet gear that is operably connected to the carrier system, each of the at least one planet gear is operably connected to an intermediate gear on a respective intermediate shaft, and the intermediate gear is operably connected to the ring gear.

* * * * *